United States Patent [19]

Cook

[11] Patent Number: 4,922,400
[45] Date of Patent: May 1, 1990

[54] NEUTRAL FORMING CIRCUIT

[75] Inventor: Alexander Cook, Rockford, Ill.

[73] Assignee: Sundstrand Corporation, Rockford, Ill.

[21] Appl. No.: 388,852

[22] Filed: Aug. 3, 1989

[51] Int. Cl.⁵ ............................................. H02M 5/458
[52] U.S. Cl. ........................................ 363/37; 363/98; 363/132
[58] Field of Search ..................... 363/35, 37, 40, 41, 363/47, 48, 95, 97, 98, 131, 132

[56] References Cited

U.S. PATENT DOCUMENTS

| | | | |
|---|---|---|---|
| 3,775,663 | 11/1973 | Turnbull | 363/41 |
| 4,617,622 | 10/1986 | Fox | 363/98 |
| 4,706,180 | 11/1987 | Wills | 363/41 X |
| 4,833,584 | 5/1989 | Divan | 363/98 X |
| 4,847,745 | 7/1989 | Shekhawat et al. | 363/132 |
| 4,862,342 | 8/1989 | Dhyanchand et al. | 363/132 X |

Primary Examiner—Pátrick R. Salce
Assistant Examiner—Emanuel Todd Voeltz
Attorney, Agent, or Firm—Marshall, O'Toole, Gerstein, Murray & Bicknell

[57] ABSTRACT

Prior neutral forming circuits for use in developing a neutral voltage for loads coupled to an inverter have been unduly large and heavy or have required that the inverter be operated by a half bridge control which causes less easily filtered harmonics to be produced in the inverter output. In order to overcome these problems, a neutral forming circuit includes first and second impedances coupled together at a junction to form a series combination which is coupled across a pair of DC link conductors coupled to an inverter input and a third impedance coupled between the junction and a neutral terminal at which the neutral voltage is formed, the first through third impedances forming a resonant circuit having a resonant frequency substantially equal to the output frequency of the inverter.

5 Claims, 2 Drawing Sheets

NEUTRAL FORMING CIRCUIT

TECHNICAL FIELD

The present invention relates generally to power converters, and more particularly to a neutral forming circuit for an inverter.

BACKGROUND ART

There are numerous applications where it is desired to convert DC power into AC power including one or more phase voltages and a neutral voltage. For example, in a variable speed, constant frequency (VSCF) power generating system, variable frequency AC power is produced by a brushless, synchronous generator driven by a variable speed prime mover. The variable frequency AC power is converted into DC power on a DC link by a rectifier bridge and the DC power is converted into polyphase constant frequency AC power by a polyphase inverter. The inverter may be operated by a full bridge control which develops a fundamental AC component of relatively large amplitude and harmonics, in particular triplen harmonics, generally having lesser amplitudes. A neutral voltage is typically formed at a neutral terminal of a neutral forming transformer (NFT) coupled to the inverter output. The neutral voltage, however, is not fixed relative to the DC voltage on the DC link. Unbalanced currents in such a system resulting from unbalanced loads flow from the neutral terminal through the windings of the NFT and the inverter switches back to the generator. Hence, unbalanced loads are a determining factor in sizing system components, in particular the NFT, which adds significant size and weight to the inverter. This, in turn, may render the VSCF system unsuitable for certain applications, such as in aircraft or other airborne equipment. Instead of the full bridge inverter control, the inverter may be operated by a half bridge control which develops a fundamental component at a relatively lower amplitude and hence the DC voltage on the DC link must be higher for a given inverter output voltage magnitude as compared with an inverter operated by a full bridge control. However, a neutral voltage can be formed on the input side of the inverter so that the neutral is fixed relative to the voltage on the DC link. This, in conjunction with the fact that all of the inverter phases are individually controllable, facilitates the conduction of neutral currents and thus the handling of unbalanced loads. However, the half bridge control causes the inverter to develop harmonics in the inverter output which are not as easily filtered as the harmonics produced using the full bridge control.

Turnbull, U.S. Pat. No. 3,775,663, discloses an inverter having an electronically controlled neutral forming circuit. The circuit includes a pair of switches coupled across a DC link and a control for operating the switches to maintain a junction between the switches at a neutral voltage.

SUMMARY OF THE INVENTION

In accordance with the present invention, a neutral forming circuit develops a neutral voltage for one or more loads coupled to an inverter.

More particularly, a neutral forming circuit which develops a neutral voltage relative to an AC voltage produced at an output frequency by an inverter having inputs coupled to first and second DC link conductors includes first and second impedances coupled together at a junction to form a series combination which is coupled across the DC link conductors and a third impedance coupled between the junction and a neutral terminal at which the neutral voltage is formed. The first through third impedances form a resonant circuit having a resonant frequency substantially equal to the output frequency of the inverter.

In the preferred embodiment, the first and second impedances comprise capacitors of substantially equal capacitances wherein the third impedance comprises an inductor.

The resonant circuit formed by the three impedances couples the output of the inverter with the DC link conductors so that neutral currents arising from unbalanced loads can be circulated without return of harmonic currents to the input of the inverter which would cause generation of still further harmonics in the inverter output.

The neutral forming circuit of the present invention finds particular utility when used with an inverter operated by a full bridge control. In this case, the neutral forming transformer or other neutral forming circuit coupled to the inverter output is replaced by the relatively smaller and lighter inductor, and hence the size and weight of the system in which the circuit is used are substantially reduced.

DESCRIPTION OF THE PREFERRED EMBODIMENT

Figure 1:
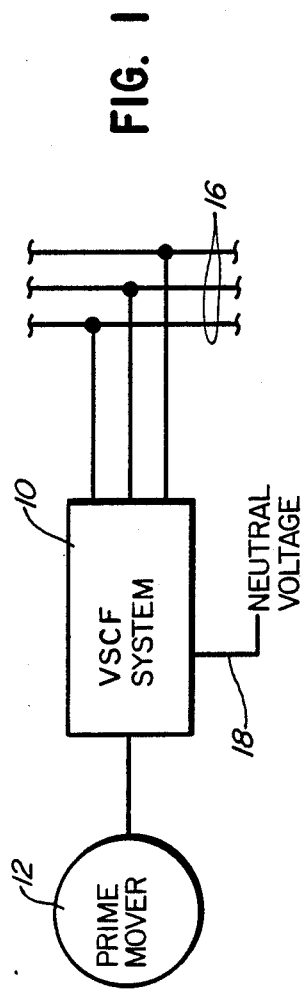
FIG. 1 is a block diagram of a power generating system.

Referring now to FIG. 1, a variable speed, constant frequency (VSCF) power generating system 10 converts variable speed motive power produced by a prime mover 12, such as an aircraft jet engine, into constant frequency AC electrical power which is delivered to a load bus 16 to which one or more AC loads are connected. The VSCF system 10 also develops a neutral voltage which may be supplied over a line 18 to the loads.

Figure 2:
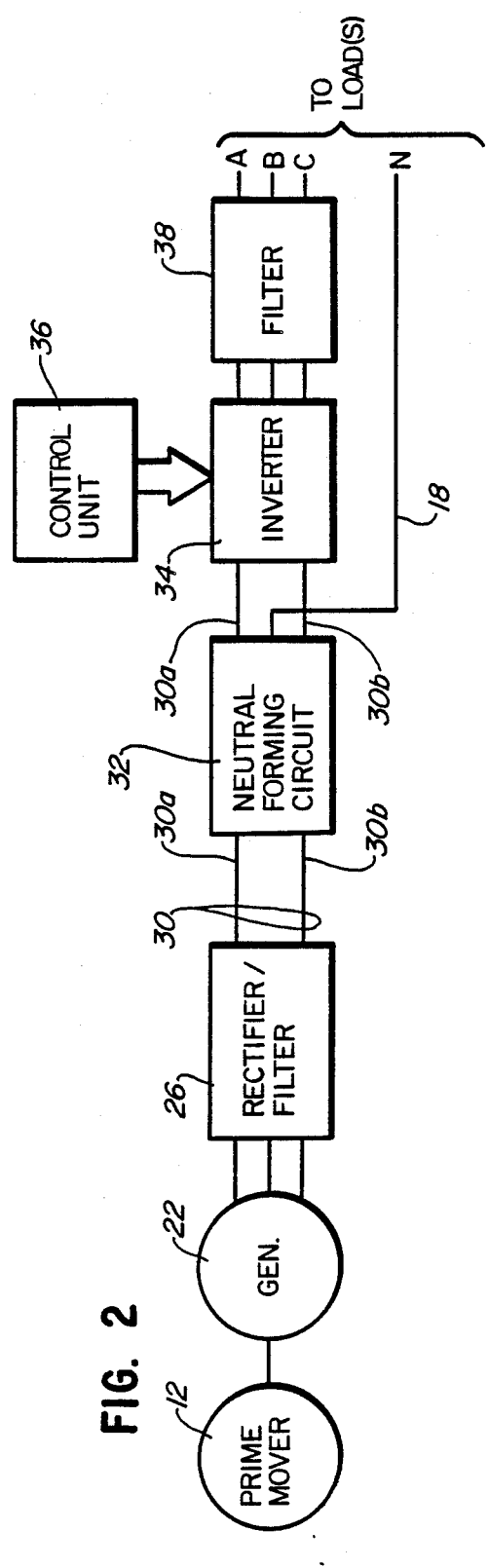
FIG. 2 comprises a combined, simplified mechanical and electrical block diagram of the power generating system shown in FIG. 1.

Referring to FIG. 2, the VSCF system 10 includes a brushless, synchronous generator 22 driven by the prime mover 12. The generator 22 develops polyphase, variable frequency AC power which is provided to a rectifier/filter 26. The rectifier/filter 26 converts the AC power into DC power which is provided over a DC link 30 to a neutral forming circuit 32 according to the present invention. The neutral forming circuit develops the neutral voltage on the line 18 and, in addition, passes the DC voltage appearing across conductors 30a and 30b of the DC link 30 to an inverter 34. The inverter 34 includes a plurality of power switches connected in a three-phase bridge configuration which are operated by a control unit 6 to produce three-phase AC power. The AC power may be filtered by an optional filter 38 and provided to the load bus 16.

Figure 3:
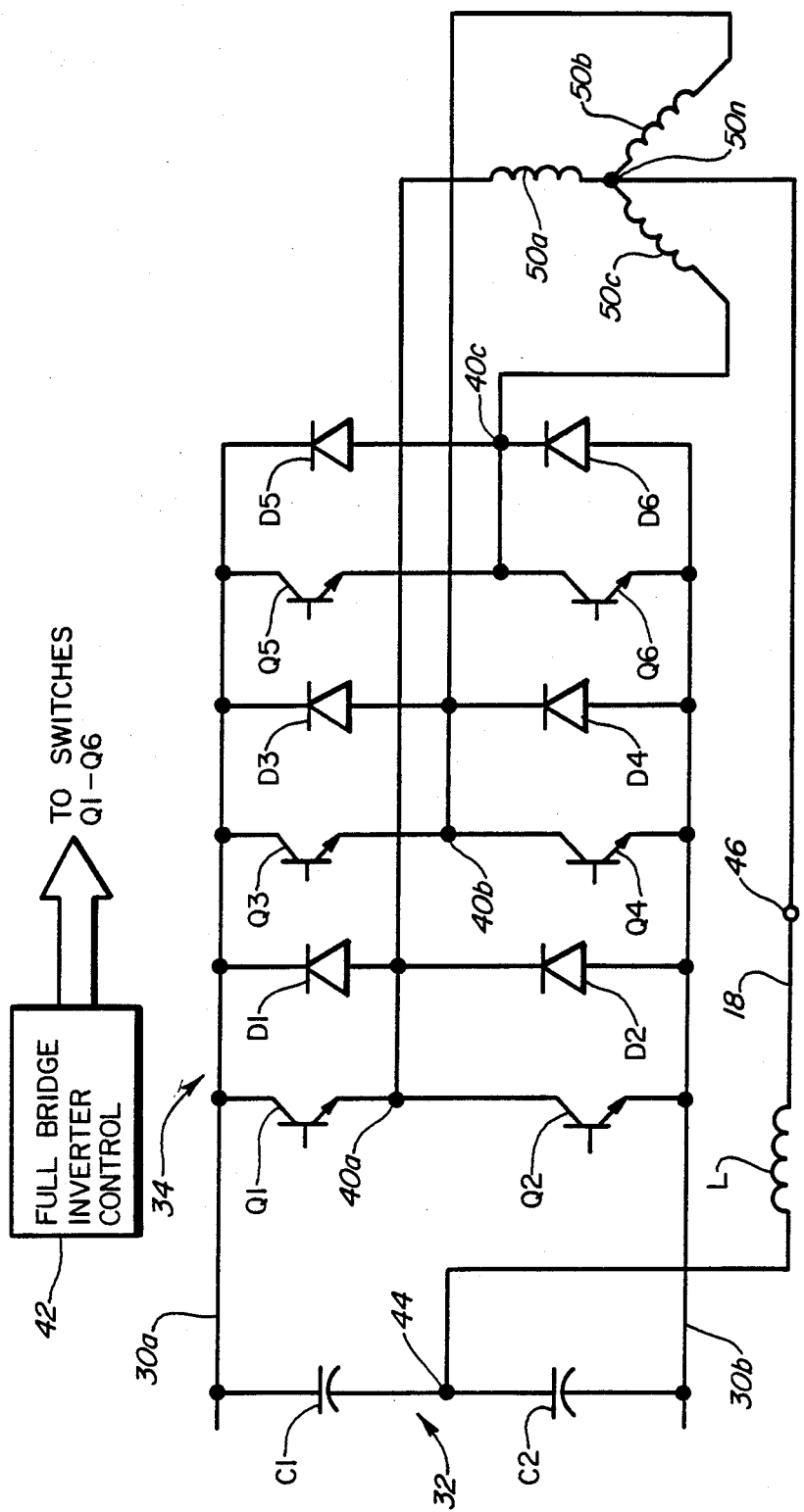
FIG. 3 comprises a simplified schematic diagram of the inverter of FIG. 2 together with a schematic diagram of the neutral forming circuit according to the present invention.

As seen in greater detail in FIG. 3, the inverter 34 includes six power switches Q1–Q6 arranged in three series-connected pairs, together with associated antiparallel or flyback diodes D1-D6. Phase output voltages are produced at junctions 40a, 40b and 40c between series-connected power switches. Preferably, the switches Q1-Q6 are operated by a full bridge inverter control 42 which is a part of the control unit 36.

The neutral forming circuit 32 includes first and second impedances in the form of capacitors C1 and C2 which are coupled together at a junction 44 to form a series combination which is coupled across the DC link conductors 30a and 30b. A third impedance in the form of an inductor L is coupled between the junction 44 and a neutral terminal 46 at which the neutral voltage is formed. Preferably, the capacitors C1, C2 and the inductor L together form a resonant circuit having a resonant frequency substantially equal to the output frequency of the inverter 34. For aircraft applications, this frequency is typically 400 hertz, although a different output frequency may be provided by the inverter 34. At this frequency, the resonant circuit has a combined inpedance substantially equal to zero.

Also in the preferred embodiment, the capacitors C1 and C2 have equal capacitances so that a voltage substantially midway between the voltages appearing on the lines 30a and 30b is produced at the terminal 44.

As seen in FIG. 3, a load represented by phase impedances 50a-50c is connected in a wye configuration and includes a neutral load terminal 50n which is coupled to the neutral terminal 46. When the impedances 50a-50c are equal and the switches Q1-Q6 are operated to produce equal voltages across the impedances, the load is in a balanced condition, and hence no current flows in the line 18. However, unbalanced load conditions can arise when the load impedances and/or the phase output voltages are unequal, in which case current flows through the neutral line 18 at the fundamental output frequency of the inverter 34. Since the resonant circuit comprising the capacitors C1, C2 and the inductor appears as a short circuit at this frequency, unbalanced currents flow freely from the neutral terminal 46 to the DC link 30 so that the voltage at the terminal 50n is maintained at the neutral voltage.

The values of the capacitors C1 and C2 and the inductor L must be selected taking into consideration the impedance of the source comprising the generator 22 and the rectifier/filter 26 as well as system requirements, such as local inverter decoupling.

It should be noted that the neutral forming circuit 32 of the present invention is not limited to use with inverters used in VSCF systems or inverters operated by a full bridge control. Rather, the circuit 32 finds utility with any type of inverter circuit where it is desired to form a neutral potential.

I claim:

1. A neutral forming circuit which develops a neutral voltage relative to an AC voltage produced at an output frequency by an inverter coupled to first and second DC link conductors, comprising:
    first and second impedances coupled together at a junction to form a series combination which is coupled across the DC link conductors; and
    a third impedance coupled between the junction and a neutral terminal at which the neutral voltage is formed, the first through third impedances forming a resonant circuit having a resonant frequency substantially equal to the output frequency of the inverter.

2. The neutral forming circuit of claim 1, wherein the first and second impedances comprise capacitors having substantially equal capacitances.

3. The neutral forming circuit of claim 2, wherein the third impedance comprises an inductor.

4. A neutral forming circuit which develops a neutral voltage relaive to three-phase AC voltages produced at an output frequency by a three-phase inverter operated by a full bridge inverter control and having inputs coupled to first and second DC link conductors, comprising:
    first and second capacitors coupled together at a junction to form a series combination which is coupled across the DC link conductors; and
    an inductor coupled between the junction and a neutral terminal at which the neutral voltage is formed, the capacitors and inductor forming a resonant circuit having a resonant frequency substantially equal to the output frequency of the inverter.

5. The neutral forming circuit of claim 4, wherein the first and second capacitors have substantially equal capacitances.

* * * * *